(12) United States Patent
Shibata et al.

(10) Patent No.: US 7,519,471 B2
(45) Date of Patent: Apr. 14, 2009

(54) DRIVING SUPPORT METHODS, APPARATUS, AND PROGRAMS

(75) Inventors: Yumi Shibata, Okazaki (JP); Yukio Yamamoto, Okazaki (JP)

(73) Assignee: Aisin AW Co., Ltd., Anjo (JP)

(*) Notice: Subject to any disclaimer, the term of this patent is extended or adjusted under 35 U.S.C. 154(b) by 0 days.

(21) Appl. No.: 11/245,096

(22) Filed: Oct. 7, 2005

(65) Prior Publication Data

US 2006/0085125 A1    Apr. 20, 2006

(30) Foreign Application Priority Data

Oct. 15, 2004    (JP) .............................. 2004-301807

(51) Int. Cl.
*G01C 21/30* (2006.01)
*G01C 21/32* (2006.01)

(52) U.S. Cl. .................. 701/211; 701/36; 701/96; 701/209; 701/301; 701/302; 340/995.19; 340/995.27; 340/995.28; 340/903; 340/461; 340/435; 340/436; 340/425.5; 345/958; 345/427; 345/959; 345/7; 359/857; 359/630

(58) Field of Classification Search ................ 701/211, 701/209, 36, 96, 301, 302; 340/995.19, 990, 340/995.27, 995.28, 903, 461, 435, 436, 340/425.5; 345/958, 427, 959, 7; 359/857, 359/630
See application file for complete search history.

(56) References Cited

U.S. PATENT DOCUMENTS

| | | | | |
|---|---|---|---|---|
| 4,878,170 A | * | 10/1989 | Zeevi | 701/211 |
| 5,305,012 A | * | 4/1994 | Faris | 345/7 |
| 5,410,346 A | * | 4/1995 | Saneyoshi et al. | 348/116 |
| 5,469,298 A | * | 11/1995 | Suman et al. | 359/630 |
| 5,510,983 A | * | 4/1996 | Iino | 701/1 |
| 5,521,579 A | * | 5/1996 | Bernhard | 340/438 |
| 5,615,023 A | * | 3/1997 | Yang | 359/13 |
| 5,731,903 A | * | 3/1998 | Cook | 359/633 |
| 5,949,331 A | * | 9/1999 | Schofield et al. | 340/461 |
| 6,081,206 A | * | 6/2000 | Kielland | 340/937 |
| 6,191,704 B1 | * | 2/2001 | Takenaga et al. | 340/903 |
| 6,289,278 B1 | * | 9/2001 | Endo et al. | 701/208 |
| 6,353,788 B1 | * | 3/2002 | Baker et al. | 701/96 |
| 6,414,796 B1 | * | 7/2002 | Muromachi et al. | 359/630 |
| 6,515,597 B1 | * | 2/2003 | Wada et al. | 340/988 |
| 6,674,370 B2 | * | 1/2004 | Rodewald et al. | 340/815.4 |
| 6,708,087 B2 | * | 3/2004 | Matsumoto | 701/1 |
| 6,891,563 B2 | * | 5/2005 | Schofield et al. | 348/148 |
| 6,947,064 B1 | * | 9/2005 | Hahn et al. | 701/301 |

(Continued)

FOREIGN PATENT DOCUMENTS

DE    102 36 221 C1    11/2003

(Continued)

*Primary Examiner*—Khoi Tran
*Assistant Examiner*—Jorge O Peche
(74) *Attorney, Agent, or Firm*—Oliff & Berridge, PLC

(57) ABSTRACT

Apparatus, methods, and programs display a virtual escort vehicle that appears to be driving ahead of a user's vehicle on at least one of a windshield of the user's vehicle and a display disposed in front of a driving seat of the user's vehicle and display a driving instruction for the user's vehicle based on actual driving condition information and standard driving condition information for a predetermined reference point located ahead of the current position of the user's vehicle.

2 Claims, 12 Drawing Sheets

U.S. PATENT DOCUMENTS

| | | | |
|---|---|---|---|
| 7,068,155 B2* | 6/2006 | Kade et al. | 340/436 |
| 7,135,961 B1* | 11/2006 | Operowsky et al. | 340/425.5 |
| 7,161,616 B1* | 1/2007 | Okamoto et al. | 348/148 |
| 7,275,831 B2* | 10/2007 | Knoll et al. | 353/13 |
| 7,370,983 B2* | 5/2008 | DeWind et al. | 359/844 |
| 7,375,895 B2* | 5/2008 | Brynielsson | 359/630 |
| 7,379,813 B2* | 5/2008 | Kubota et al. | 701/211 |
| 2001/0040505 A1* | 11/2001 | Ishida et al. | 340/435 |
| 2002/0049534 A1* | 4/2002 | Yuda et al. | 701/209 |
| 2002/0055808 A1* | 5/2002 | Matsumoto | 701/1 |
| 2002/0186228 A1* | 12/2002 | Kobayashi et al. | 345/633 |
| 2004/0095651 A1* | 5/2004 | Aoki et al. | 359/630 |
| 2004/0178894 A1* | 9/2004 | Janssen | 340/435 |
| 2005/0021195 A1* | 1/2005 | Zeitler et al. | 701/23 |
| 2005/0071082 A1* | 3/2005 | Ohmura et al. | 701/211 |
| 2005/0093719 A1* | 5/2005 | Okamoto et al. | 340/995.1 |
| 2005/0107952 A1* | 5/2005 | Hoshino et al. | 701/211 |
| 2005/0154505 A1* | 7/2005 | Nakamura et al. | 701/1 |
| 2006/0055525 A1* | 3/2006 | Kubota et al. | 340/461 |
| 2006/0071877 A1* | 4/2006 | Kanamori et al. | 345/7 |
| 2006/0074547 A1* | 4/2006 | Kaufman et al. | 701/200 |
| 2006/0100774 A1* | 5/2006 | Barkowski et al. | 701/200 |
| 2006/0142941 A1* | 6/2006 | Imai et al. | 701/211 |
| 2006/0155467 A1* | 7/2006 | Hortner et al. | 701/211 |
| 2006/0212194 A1* | 9/2006 | Breed | 701/29 |
| 2008/0059037 A1* | 3/2008 | Isaji et al. | 701/93 |

FOREIGN PATENT DOCUMENTS

| | | |
|---|---|---|
| DE | 102 45 334 A1 | 4/2004 |
| EP | 1 195 578 A | 4/2002 |
| EP | 1 521 059 A | 4/2005 |
| JP | A 09-189565 | 7/1997 |
| JP | A 2002-254764 | 10/2003 |

* cited by examiner

DRIVING SUPPORT METHODS, APPARATUS, AND PROGRAMS

INCORPORATION BY REFERENCE

The disclosure of Japanese Patent Application No. 2004-301807 filed on Oct. 15, 2004, including the specification, drawings and abstract, is incorporated herein by reference in its entirety.

BACKGROUND

1. Related Technical Fields

Related technical fields include driving support methods and driving support apparatus.

2. Related Art

Conventional navigation apparatus may assist a driver in driving his or her vehicle. A navigation apparatus has been proposed that is capable of detecting a road condition such as a curve or a slope of a road ahead of the current position of a vehicle, determining supporting information in terms of the curving direction, the curvature radius, and/or the length of a curving road or the slope of a sloping road, and displaying the determined supporting information to assist the driver in driving the vehicle (see, for example, Japanese Unexamined Patent Application Publication No. 9-189565).

SUMMARY

However, according to the above conventional navigation apparatus, when supporting information is presented by a navigation apparatus during actual driving, a road form predicted based on the presented supporting information is often different from a road form actually observed by a driver. In particular, when a driver drives his/her vehicle on an unfamiliar road, a difference between a road form predicated by the navigation apparatus based on the supporting information and the actual road form may make it difficult for the driver to drive the vehicle.

Thus, it is beneficial to provide a driving support method and a driving support apparatus, capable of providing a proper driving instruction based on prediction made in advance in terms of an actual road condition.

Accordingly, various exemplary implementations of the principles described herein provide apparatus, methods, and programs that display a virtual escort vehicle that appears to be driving ahead of a user's vehicle on at least one of a windshield of the user's vehicle and a display disposed in front of a driving seat of the user's vehicle and display a driving instruction for the user's vehicle based on actual driving condition information and standard driving condition information for a predetermined reference point located ahead of the current position of the user's vehicle.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
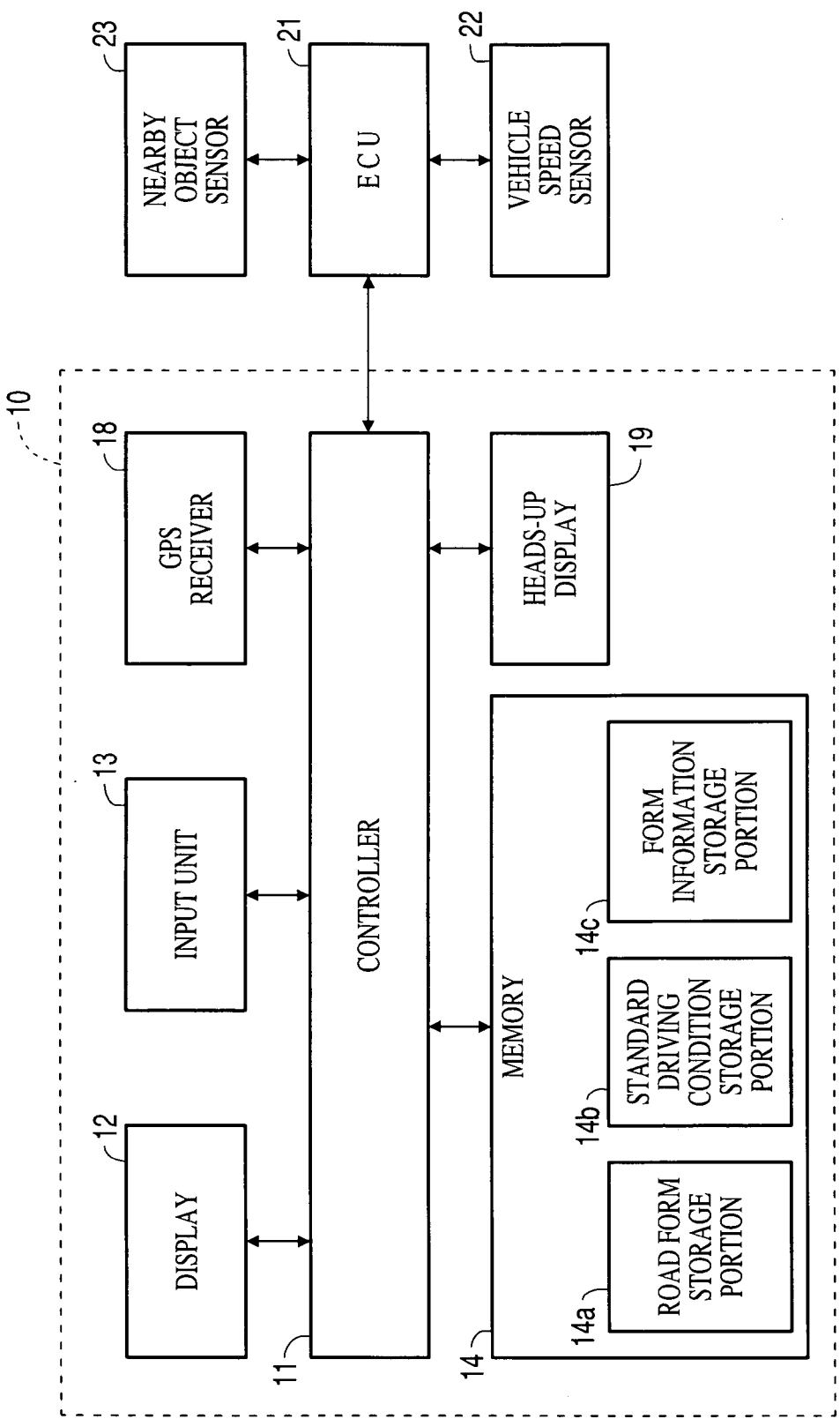
FIG. 1 is a block diagram showing a driving support apparatus according to an exemplary implementation of the principles described herein.

FIG. 1 shows an exemplary driving support apparatus, for example, a navigation apparatus installed in a vehicle. As shown in FIG. 1, the navigation apparatus 10 may include a controller 11 that includes, for example, a microcomputer. The controller 11, for example, in accordance with a route guiding program, may search for a route from a current position to a destination, may calculate a current position, may guide along a searched route, may output a map on which the route is displayed, and/or may perform various processes similar to those performed by known and/or later developed navigation apparatus.

The navigation apparatus 10 may includes a display 12 that may be connected to the controller 11 via, for example, a bus. The display 12 may be a liquid crystal display device of a touch panel type for displaying an image. Under the control of the controller 11, the display 12 may display, for example, a guidance image for guiding a route, an image indicating a current position, and/or other images. The display 12 may include a touch switching capability. For example, if a user presses a particular point on the screen of the display 12 with his or her finger, the location of the touched point on the screen may be detected, and an operation signal, such as, for example, a route guiding command that depends on the location of the touched point may be output to the controller 11. The navigation apparatus 10 may also include an input unit 13, for example, including various operation switches for use by a user to receive driving support and/or route guiding service. When one of these operation switches is operated, an operation signal may be generated and supplied to the controller 11.

The navigation apparatus 10 may include a memory 14, for example, storing map data, which is, for example, connected to the controller 11 via a data bus. The memory 14 may include, for example, an external storage medium such as a RAM, a ROM, a hard magnetic disk, and/or an optical disk. In the memory 14, a route-guiding program, which may be executed by the controller 11, and/or other programs similar to those executed in the known navigation apparatus may be stored. The memory 14 may also store, for example, destination data and map data used by the controller 11 to set a destination and/or node data, link data, and/or road information used by the controller 11 in searching for a route.

As used herein, the term "link" refers to, for example, a road or portion of a road. For example, according to one type of road data, each road may consist of a plurality of componential units called links. Each link may be separated and defined by, for example, an intersection, an intersection having more than three roads, a curve, and/or a point at which the road type changes. As used herein the term "node" refers to a point connecting two links. A node may be, for example, an intersection, an intersection having more than three roads, a curve, and/or a point at which the road type changes.

Figure 2:
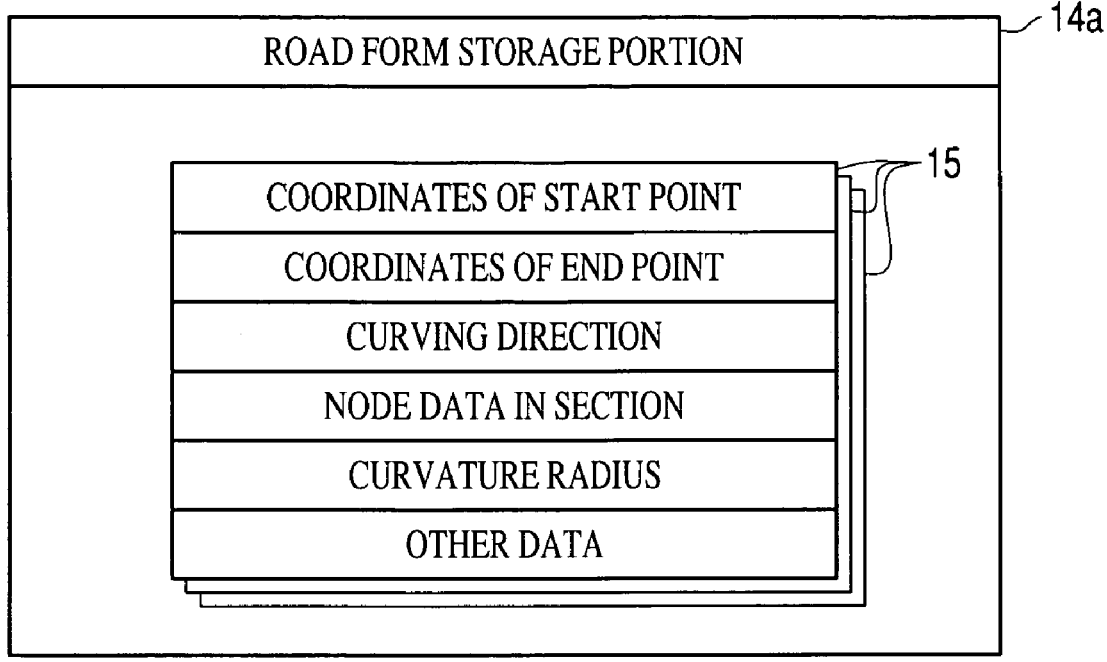
FIG. 2 is a schematic diagram illustrating a data structure of curving road information.
Figure 3:
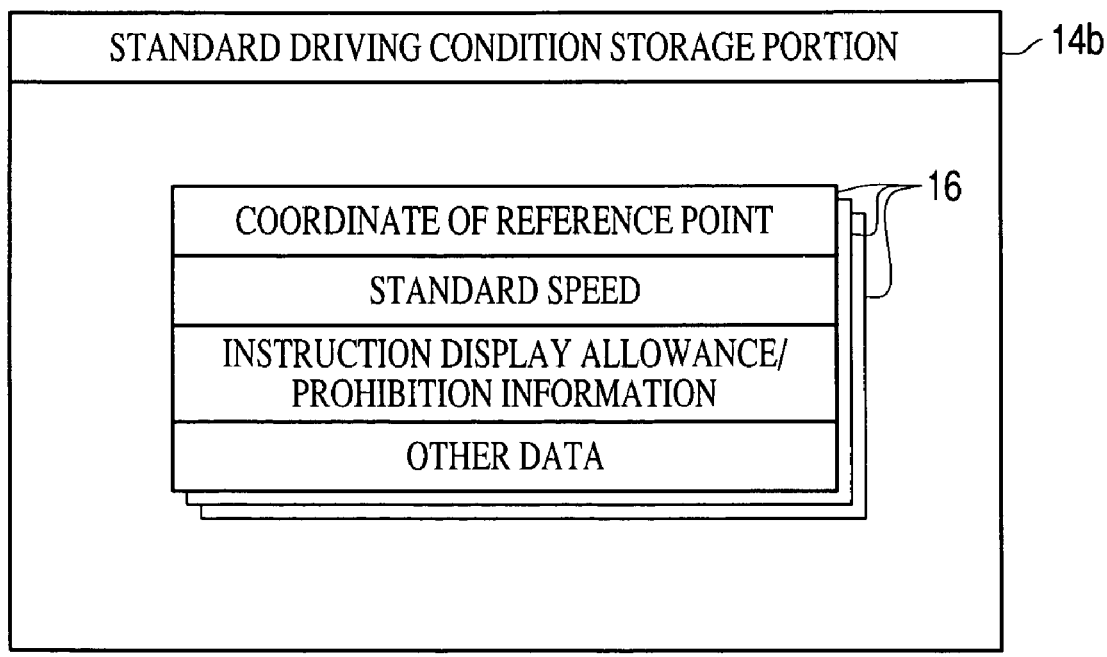
FIG. 3 is a schematic diagram illustrating a data structure of standard driving condition information.

The memory 14 may physically, functionally, and/or conceptually include a road form storage portion 14a that stores road forms and/or a standard driving condition storage portion 14b that stores standard driving conditions. The road form storage portion 14a may store curving road information 15 that is road condition information indicating curving roads. The standard driving condition storage portion 14b my store standard driving condition information 16 associated with predetermined points (reference points). FIG. 2 is a schematic diagram illustrating a data structure of curving road information 15. FIG. 3 is a schematic diagram illustrating a data structure of standard driving condition information 16.

As shown in FIG. 2, the curving road information 15 may be set for each pre-selected curving road. The curving road information 15 for each pre-selected curving road may include data, for example, indicating coordinates of starting and ending points (nodes) of a curving road section, a curving direction, node data along the curving road section, and a curvature radius.

As shown in FIG. 3, the standard driving condition information 16 may be set for each reference point. According to this example, starting points (entrance points) of respective curving roads corresponding to the curving road information 15 may be selected as reference points. That is, each reference point may be the starting point of a road section where the road condition or driving environment is different from that of a previous road section and, for example, driving should be performed in a different and/or more careful manner. The curving roads and the associated reference points may be selected as a result of test driving the road or by calculation. A reference point may be determined for each selected curving road.

As shown in FIG. 3, the standard driving condition information 16 may include data indicating coordinates (e.g., node coordinates) of a reference point, data indicating a running speed (e.g., standard speed $V_s$) at that reference point, and/or display allowance/prohibition information indicating whether displaying of the driving support instruction is allowed. The standard sped $V_s$ indicates a speed at which good cornering is possible along the curving road with a particular curvature radius starting from the reference point. The display allowance/prohibition information indicates whether displaying of a brake lamp should be performed to support the driver to drive. For example, when a curving road has a surface that causes the vehicle to easily slip, or when a curving road has a curvature greater than 30° and it is undesirable to display the brake lamp on this curving road, the display allowance/prohibition information may be set to indicate that displaying of the brake lamp is not permitted. The standard speed $V_s$ and the display allowance/prohibition information stored in the standard driving condition storage portion 14b may determined experimentally, via test driving, and/or via calculation for each reference point.

The memory 14 may include, for example, a form information storage portion 14c that stores forms information 17 indicating, for example, a graphic representation of a virtual escort vehicle IG to be displayed, for example, on a combiner CB (FIG. 5) of a windshield GL.

Figure 4:
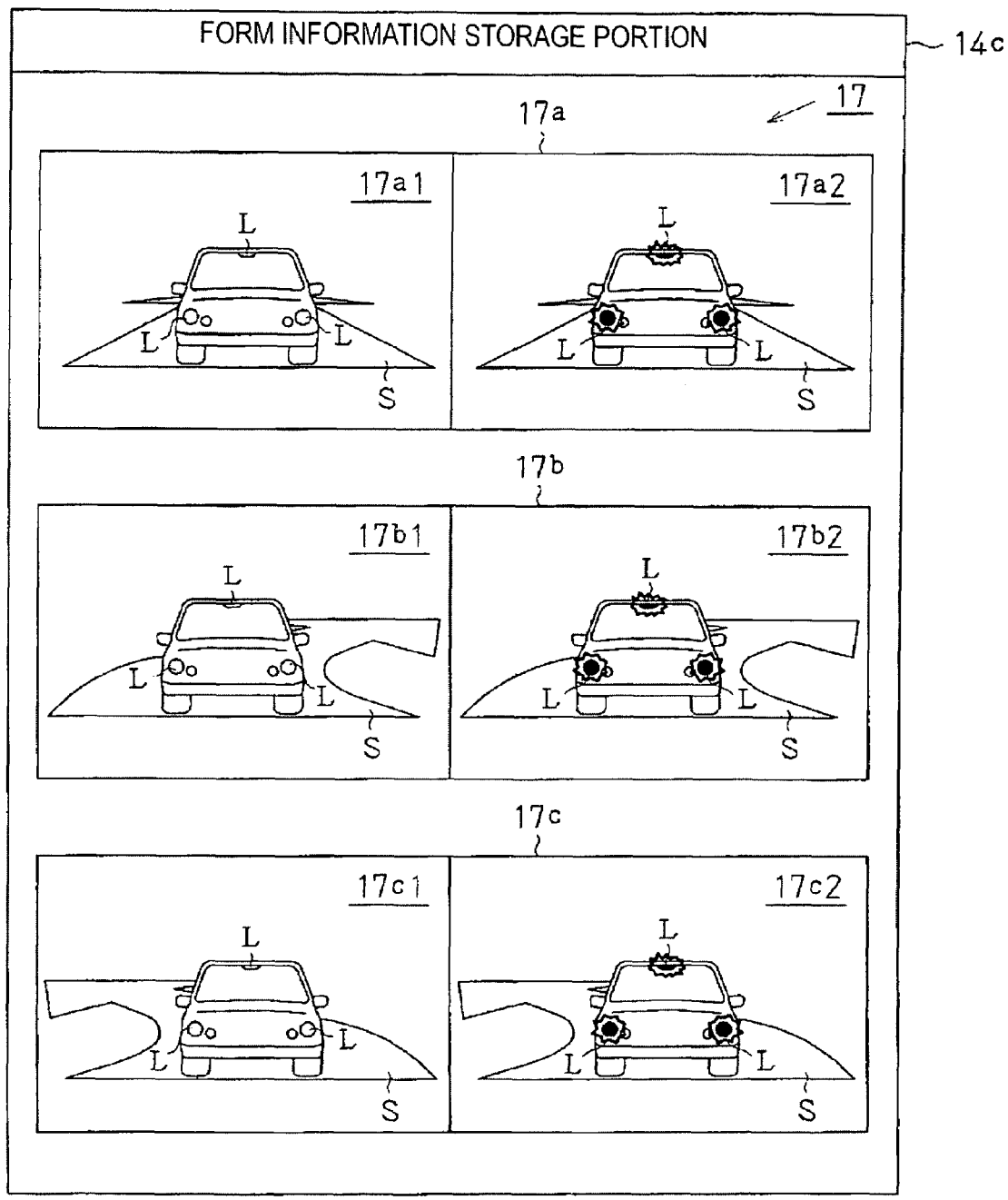
FIG. 4 is a schematic diagram illustrating forms indicated by form information.

FIG. 4 is a schematic diagram illustrating various exemplary forms that may be represented by the form information 17. There may be plural pieces of form information 17 representing various forms as shown, for example, in FIG. 4. Form information 17a may indicate a form, seen form the back, of the virtual vehicle IG running straight. The form indicated by the form information 17a may include two sub-forms 17a1 and 17a2. n the sub-form 17a1, the brake lamp may be in an off-state. In the sub-form 17a2, the brake lamp may be in an on-state. Form information 17b may indicate a form, seen form the back, of the virtual vehicle IG turning to the right. The form indicated by the form information 17b may include two sub-forms 17b1 and 17b2. In the sub-form 17b1, the brake lamp is in an off-state. In the sub-form 17b2, the brake lamp is in an on-state. Form information 17c may indicate a form, seen form the back, of the virtual vehicle IG turning to left. The form indicated by the form information 17c may include two sub-forms 17c1 and 17c2. In the sub-form 17c1, the brake lamp is in an off-state. In the sub-form 17c2, the brake lamp is in an on-state.

The indication as to whether the virtual vehicle IG is running straight or turning to right or left may be given by a mark S indicating the driving direction of the virtual vehicle IG in a particular form.

The memory 14 may store, for example, a driving support program that may be executed by the controller 11 to display driving information on, for example, a combiner CB of windshield GL based on the standard driving condition information 16 and the form information 17, for assisting a driver to drive a vehicle. Specifically, in accordance with the driving support program, the controller 11 may display the virtual vehicle IG such that the driving direction of the virtual vehicle IG, simulating a vehicle running ahead of the vehicle of the user. Because the virtual vehicle IG appears to be driving ahead of the user's vehicle, it may be changed depending on the road form to guide the driver to perform a driving operation at a location before the reference point so that the reference point can be passed through at the standard speed $V_s$ and so that the driver can drive the vehicle smoothly along the curving road.

The controller 11 may be connected to a GPS (Global Positioning System) receiver 18 that may detect a current position of the navigation apparatus 10. The GPS receiver 18 may detect the current position and the driving direction of the vehicle of the user by a satellite navigation method.

Figure 6:
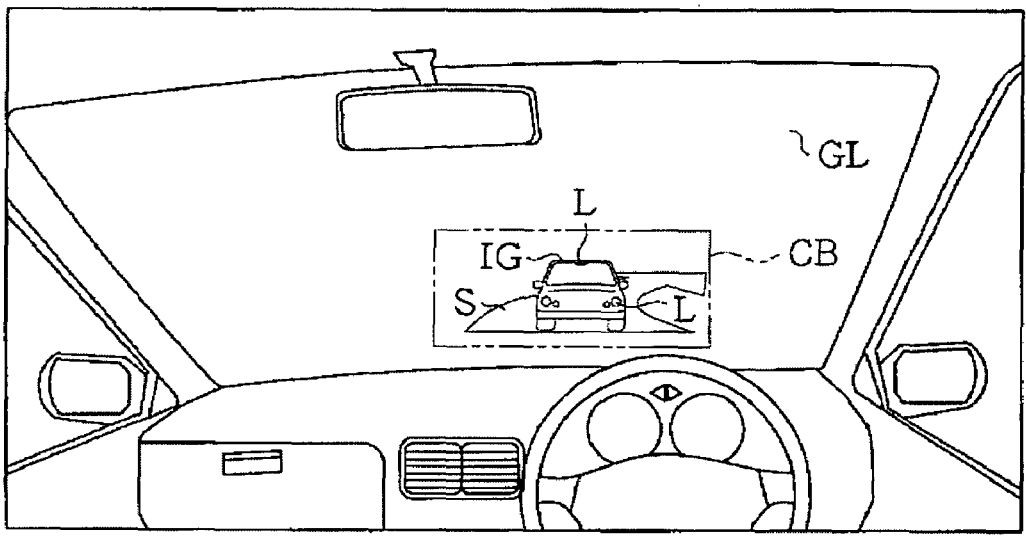
FIG. 6 is a schematic diagram illustrating a virtual escort vehicle in a state in which the virtual escort vehicle is turning to right and brake lamps are in the off-state according to an exemplary implementation of the principles described herein.
Figure 7:
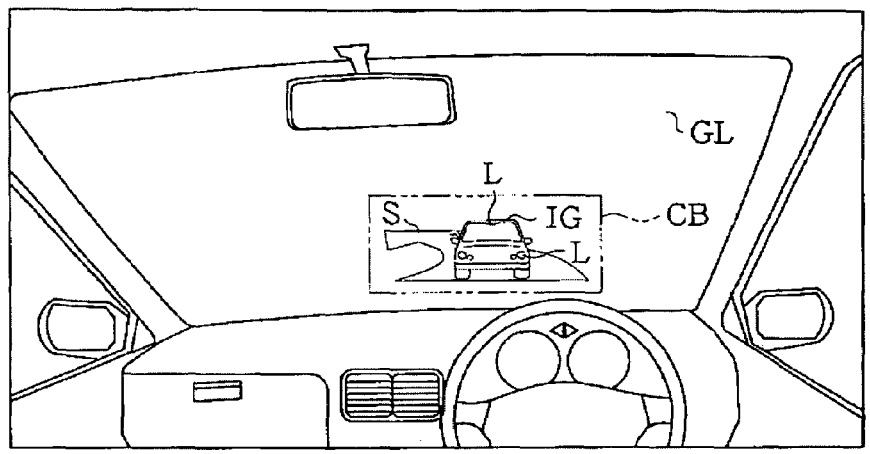
FIG. 7 is a schematic diagram illustrating a virtual escort vehicle in a state in which the virtual escort vehicle is turning to left and brake lamps are in the off-state according to an exemplary implementation of the principles described herein.

The navigation apparatus 10 may further include, for example, a heads-up display 19, for example, connected to the controller 11 via a bus. Under the control of the controller 11, the heads-up display 19 may read the form information 17 stored in the form information storage portion 14c of the information storage portion 14 and may project an image of the virtual vehicle IG in the form indicated by the read form information 17 onto, for example, the combiner CB disposed on the windshield GL. As a result, for example, the driver in the driving seat can see the virtual vehicle IG via the combiner CB, as shown in FIGS. 5 to 7, without looking away from the windshield and the road.

Figure 5:
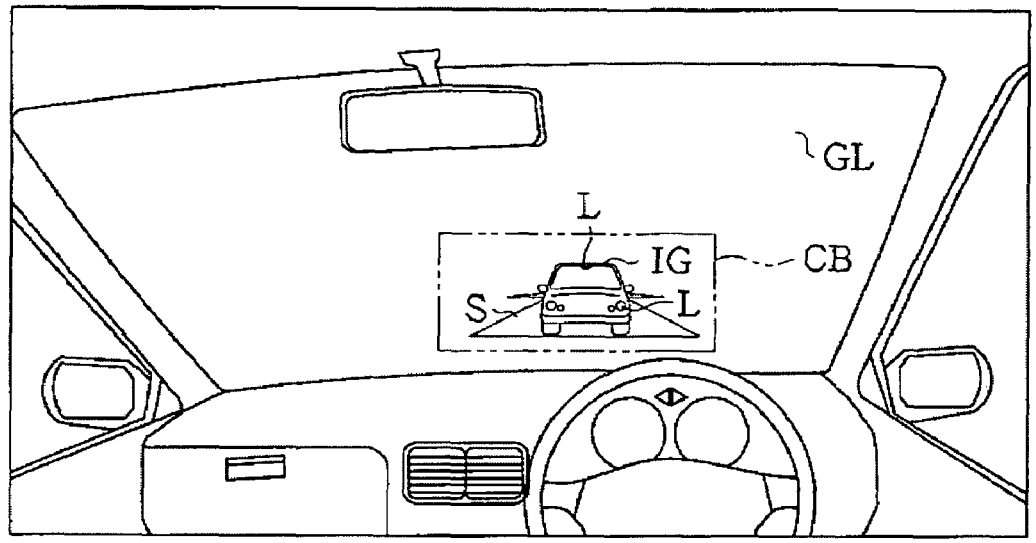
FIG. 5 is a schematic diagram illustrating a virtual escort vehicle in a state in which the virtual escort vehicle is running straight and brake lamps are in the off-state according to an exemplary implementation of the principles described herein.
Figure 8:
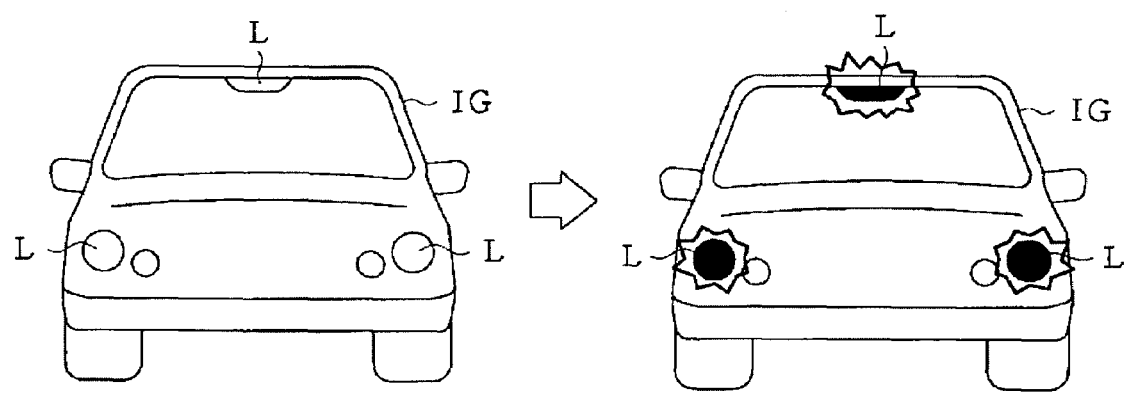
FIG. 8 is a diagram illustrating a virtual escort vehicle with a brake lamp in an on-state and a virtual escort vehicle with a brake lamp in an off-state according to an exemplary implementation of the principles described herein.
Figure 9:
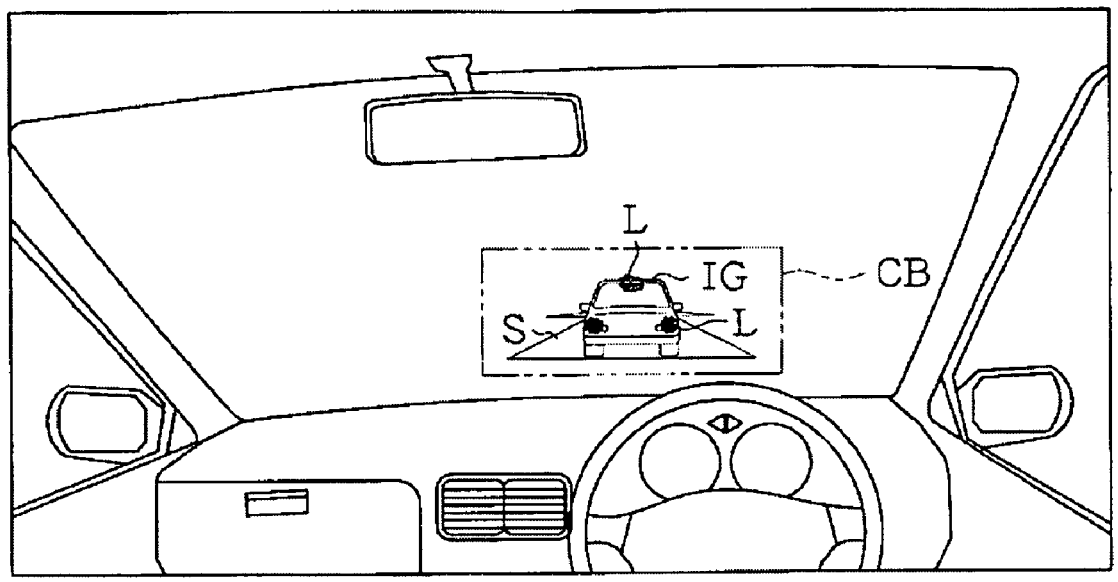
FIG. 9 is a schematic diagram illustrating a virtual escort vehicle in a state in which the virtual escort vehicle is running straight and brake lamps are in the on-state according to an exemplary implementation of the principles described herein.

In the example shown in FIG. 5, the virtual escort vehicle IG with the brake lamps L in the off-state and running straight is displayed in accordance with the form 17a1. In the example shown in FIG. 6, the virtual escort vehicle IG with the brake lamps L in the off-state turning to right is displayed in accordance with the form 17b1. In the example shown in FIG. 7, the virtual escort vehicle IG with the brake lamps L in the off-state turning to left is displayed in accordance with the form 17c1. When the brake lamps L of the virtual vehicle IG are in the on-state, the brake lamps L of the virtual vehicle IG in the respective forms shown in FIGS. 5 to 7 are modified as shown in FIG. 8. FIG. 9 shows the virtual escort vehicle IG similar to that shown in FIG. 5, but unlike FIG. 5, the brake lamps L are in the on-state.

The controller 11 may be capable of transmitting and receiving various kinds of data to and from, for example, an electronic control unit (ECU) 21 installed in the vehicle of the user. The ECU 21 may receive detection signals output from, for example, a vehicle speed sensor 22 and/or a nearby-object-detection sensor 23, installed on the vehicle of the user. In addition to the detection signals output from the vehicle speed sensor 22 and the nearby-object-detection sensor 23, the ECU 21 may also receive detection signals output from various other sensors. In accordance with the received signals, the ECU 21 may control the operation of the vehicle in terms of, for example, the optimum fuel injection or the optimum ignition timing.

The vehicle speed sensor 22 is a sensor for detecting the speed of the vehicle of the user. Based on the detection signal output from the vehicle speed sensor 22, the ECU 21 may calculate the current speed (actual vehicle speed $V_n$) as actual driving condition information and may supply the actual vehicle speed $V_n$ to the controller 11. The nearby object detection sensor 23 that may detect a moving object located, not only in a forward direction of the vehicle, but in any direction relative to the vehicle. The nearby object detection sensor 23 may be realized by, for example, a laser radar, a millimeter wave radar, and/or an ultrasonic sonar. Based on the detection signal output from the nearby-object-detection sensor 23, the controller 11 may determine whether there is a moving object in the vicinity of the vehicle and may further determine in which direction and how close the detected moving object is located with respect to the location of the vehicle. According to this example, the controller 11 may be capable of detecting, for example, another vehicle, a bicycle, a foot passenger, and/or an animal as a moving object, and the controller 11 may be capable of calculating the direction and the distance of the detected moving object with respect to the location of the vehicle of the user. The controller 11 may output the calculation result as moving object information.

Figure 10:
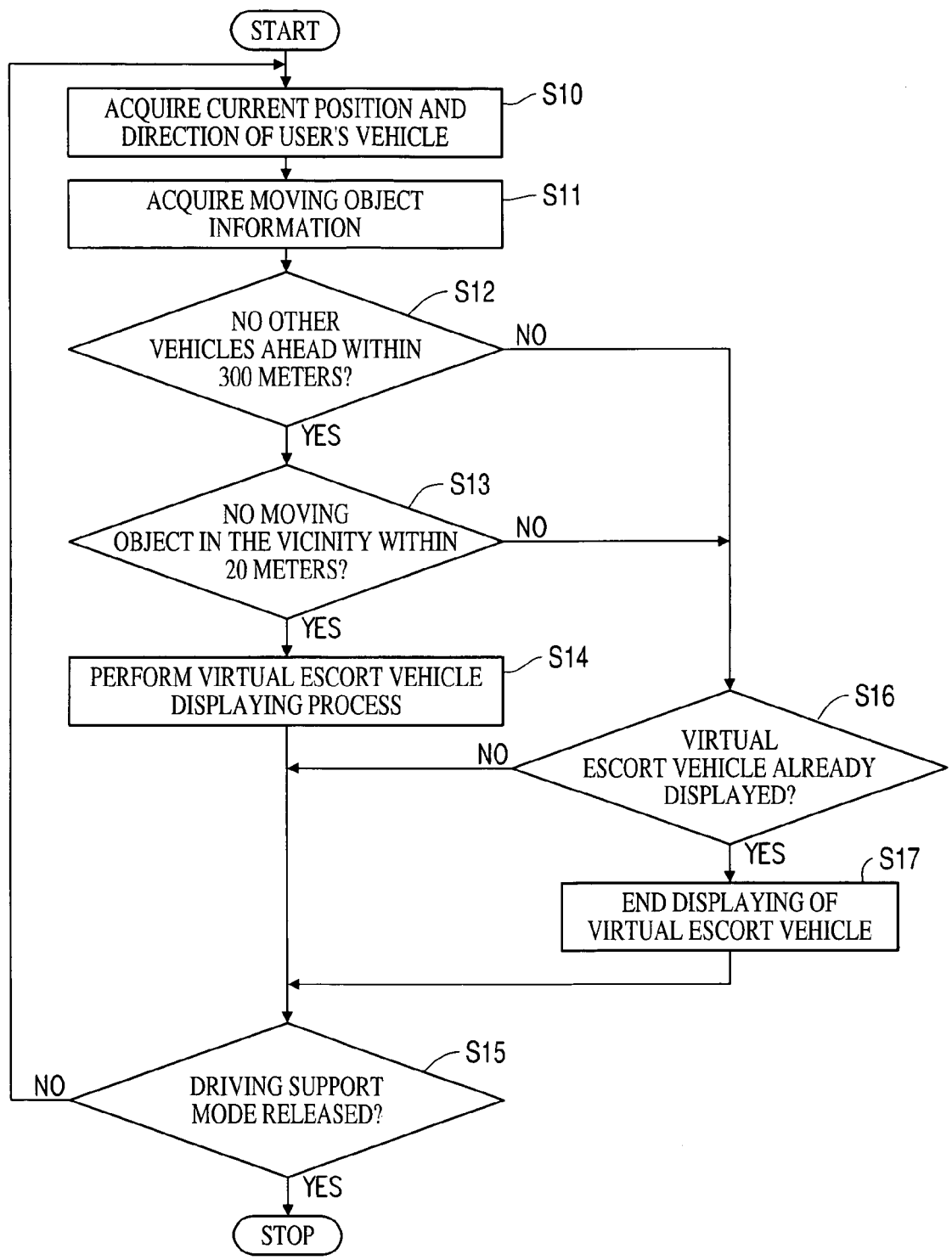
FIG. 10 shows a driving support method according to an exemplary implementation of the principles described herein.
Figure 11:
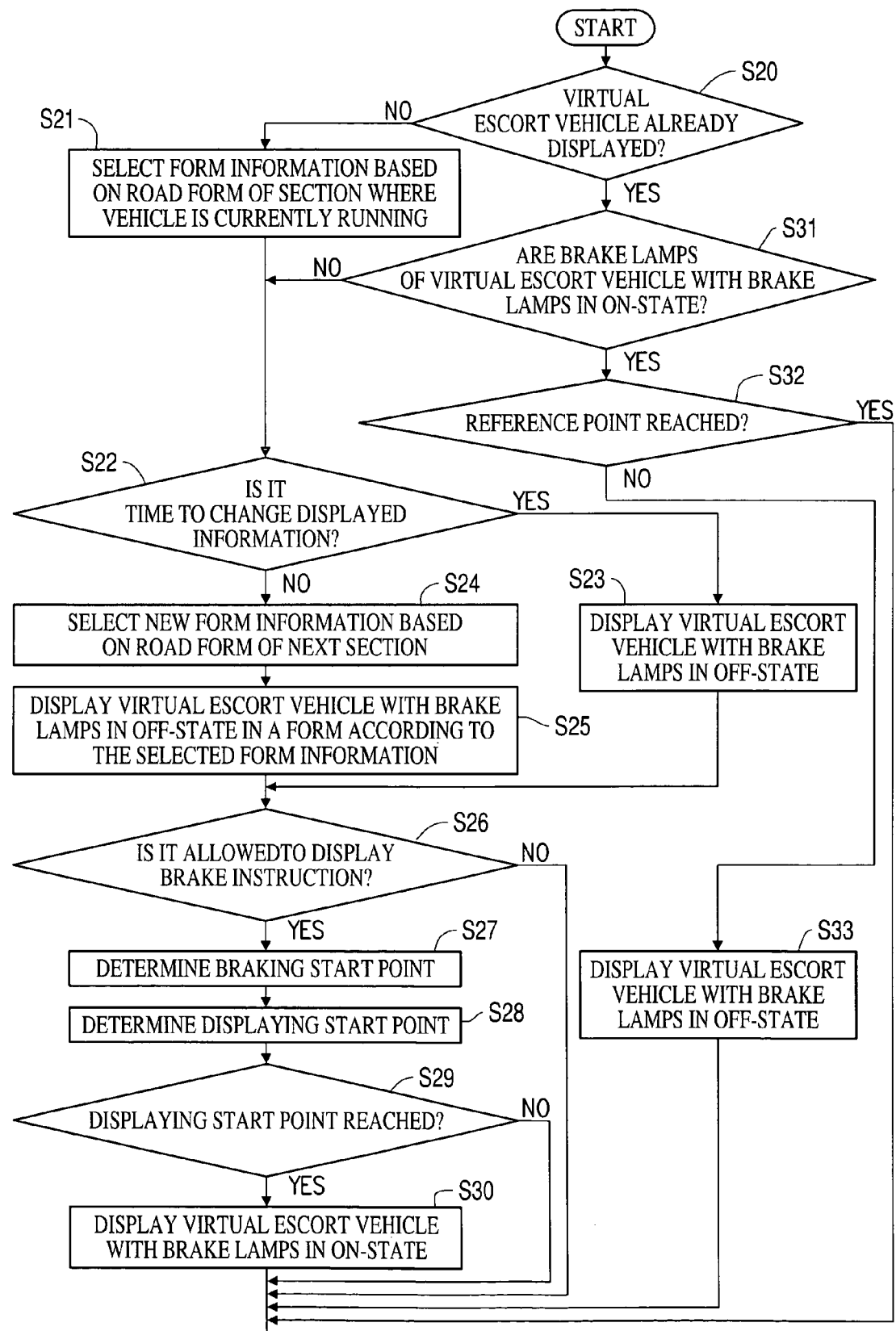
FIG. 11 shows a driving support method according to an exemplary implementation of the principles described herein.

FIGS. 10 and 11 show exemplary navigation methods. The exemplary methods may be implemented, for example, by one or more components of the above-described navigation apparatus 10. However, even though the exemplary structure of the above descried navigation apparatus is referenced in the description, it should be appreciated that the structure is exemplary and the exemplary methods need not be limited by any of the above-described exemplary structure.

While driving a vehicle, if an operation switch of the input unit 13 is pressed to set the operation mode into a driving support mode, the controller 11 may execute, for example, a driving support program that may impellent one or more of the exemplary methods. For example, the controller 11 may acquire the current position and the direction of the vehicle based on, for example, the detection signal output from the GPS receiver 18 (step S10). The controller 11 may then acquire, for example, from the ECU 21, the moving object information indicating the direction and the distance of a moving object with respect to the location of the vehicle, for example, determined based on the detection signal output from the nearby-object-detection sensor 23 (step S11). At the same time, the controller 11 may also acquire, for example, from the ECU 21, the actual vehicle speed $V_n$ of the vehicle, for example, calculated based on the detection signal output from the vehicle speed sensor 22.

Upon receiving the moving object information from the ECU 21, the controller 11 may determine whether there is another vehicle running ahead of the vehicle of the user within a range of, for example, about 300 meters, based on the acquired moving object information (step S12). If it is determined that there is no other vehicle within a range of about 300 meters (step S12=YES), the controller 11 may then determine whether there is a moving object such as, for example, a bicycle, a foot passenger, and/or an animal within, for example, about 20 meters from the vehicle of the user, based on the acquired moving object information (step S13).

If it is determined that there is no moving object within 20 meters (step S13=YES), the controller 11 may then display the virtual escort vehicle IG, for example, on the combiner CB of the windshield GL to assist the driver in driving the vehicle (step S14). The controller 11 may then determine whether the operation switch of the input unit 13 is, for example, pressed to release the driving support mode (step S15). If the driving support mode has not been released (step S15=NO), the controller 11 may again acquire the current position and the direction of the vehicle based on, for example, the detection signal output from the GPS receiver 18 (step S10). If the driving support mode has been released (step S15=YES), operation of the exemplary method ends.

If it is determined that there is another vehicle running ahead within about 300 meters (step S12=NO), the controller 11 may determine whether the virtual escort vehicle IG is already displayed (step S16). If it is determined that the virtual vehicle IG is currently displayed (step S16=YES), the controller 11 may end the displaying of the virtual escort vehicle IG (step S17) and may then determine whether the operation switch of the input unit 13 is, for example, pressed to release the driving support mode (step S15). On the other hand, if the virtual vehicle IG is not currently displayed (step S16=NO), the controller 11 may immediately determine whether the operation switch of the input unit 13 is, for example, pressed to release the driving support mode (step S15).

Furthermore, if there is a moving object within about 20 meters of the vehicle (step S13=NO), the controller 11 may also may determine whether the virtual escort vehicle IG is already displayed (step S16) and may continue with the exemplary method in a similar manner as described above.

The virtual escort vehicle IG may be displayed (e.g., step S14) according to the exemplary method shown in FIG. 11.

As shown in FIG. 11, the controller 11 may determine whether the virtual escort vehicle IG is already displayed (step S20). If the controller 11 determines that the virtual escort vehicle IG is not displayed (step S20=NO), the controller 11 may then determine the road form (e.g., straight, right-curving, or left-curving) of the road section where the vehicle is currently driving, based on, for example, the current position of the vehicle, the map data, and/or the curving road information 15 stored in the information storage portion 14. Depending on the road form, the controller 11 may select form information 17, for example, indicating a form in which the brake lamp L of the virtual escort vehicle IG in the off-state (step S21).

The controller 11 may then check the curving road information 15 stored in the road form storage portion 14a of the memory 14 to determine whether there is a start or end point of a road section and/or a start point of a next curving road within a predetermined distance ahead, thereby determining whether it is a time to switch the displayed information (step S22). For example, if a starting or end point is detected in checking of the curving road information 15, the controller 11 may determines whether the distance from the vehicle to the start or end point is equal to a running distance M that will be traveled in a predetermined standard time $t_z$ (e.g., 3 seconds) if the current actual vehicle speed $V_n$ is maintained.

Figure 12:
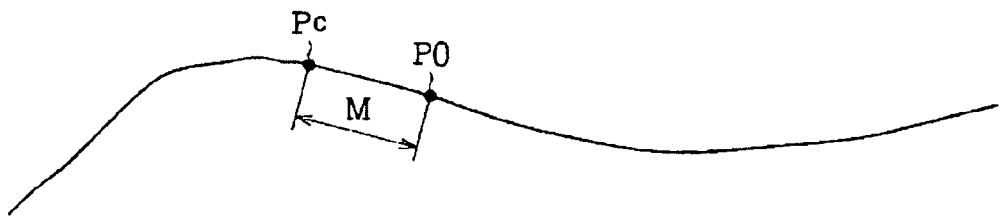
FIG. 12 is a diagram illustrating a manner in which a display change point is determined according to an exemplary implementation of the principles described herein.

Specifically, the controller 11 may determine the product of the actual vehicle speed $V_n$ and the predetermined standard time $t_z$ to determine the running distance M. As shown in FIG. 12, the controller 11 may then determines the point (display change point $P_c$) that is located a distance equal to the running distance M behind the start (or end) point PO. Thereafter, the controller 11 may determine whether the current position of the vehicle has reached the display change point $P_c$, and based on that information, the controller 11 may determine whether it is a time to switch the displayed information.

If the display change point Pc has not yet been reached (step S22=NO), the controller 11 may displays the virtual escort vehicle IG with the brake lamp L in the off-state on the combiner CB of the windshield GL via the heads-up display 19 (step S23). For example, when the road has a straight form, the virtual escort vehicle IG may be displayed as shown in FIG. 5.

On the other hand, if it is determined that the display change point Pc has been reached, and it is thus a time to switch the displayed information (S22=YES), the controller 11 then determines the road form (straight, right-curving, or left-curving form) of a next road section and, depending on the road form, the controller 11 selects form information 17 (step S24). The controller 11 displays the virtual escort vehicle IG with the brake lamp L in the off-state in the form specified by the form information 17 on the combiner CB of the windshield GL via the heads-up display 19 (step S25). For example, the vehicle may be approaching a right-curving road section from a straight road section and the virtual escort vehicle IG with the form shown in FIG. 5 is switched into the form shown in FIG. 6.

The controller 11 may then determine whether displaying of the brake lamp is allowed for the road section (step S26). Specifically, for example, the controller 11 may check the standard driving condition information 16 stored in the standard driving condition storage portion 14b of the memory 14 to determine whether there is a reference point within a predetermined distance ahead. If there is a reference point within a predetermined distance ahead, the controller 11 may read the standard driving condition information 16 associated with that reference point. The controller 11 may extract display allowance/prohibition information from the standard driving condition information 16 and may determine whether displaying of the brake lamp is allowed, based on the extracted display allowance/prohibition information. If it is determined that displaying of driving support information is allowed (step S26=YES), the controller 11 calculates the braking start point $P_s$ (step S27).

Figure 13:
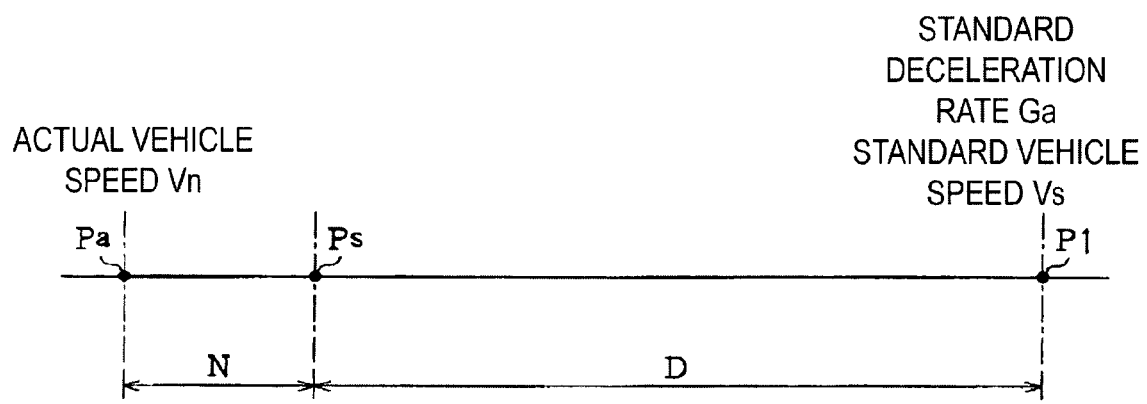
FIG. 13 is a diagram illustrating a manner in which a braking start point and an instruction display start position are determined according to an exemplary implementation of the principles described herein.

The controller 11 may determine the braking start point Ps from the standard speed $V_s$, the standard deceleration rate $G_a$, and the current actual vehicle speed $V_n$ included in the standard driving condition information 16. FIG. 13 illustrates the braking start point Ps and also an instruction display start position $P_a$, which will be described later. First, the controller 11 may determines the braking start distance D at which to start braking to reduce the vehicle speed such that the vehicle speed becomes equal to the standard speed $V_s$ when the vehicle reaches the reference point $P_1$, for example according to the following equations (1) and (2) in which the standard deceleration rate $G_a$ is set to a value (−0.16 G, for example) which will not be felt as unusually great.

$$2G_aD = V_s^2 - V_n^2 \quad (1)$$

$$D = \frac{V_s^2 - V_n^2}{2G_a} \quad (2)$$

Accordingly, the controller 11 may determine the coordinates of the braking start point Ps from the braking start distance D determined above and the reference point $P_1$.

The controller 11 then may determine the instruction display start position $P_a$ (step S28). Note that, to start the braking operation exactly at the braking start point $P_s$ determined above, the brake instruction should be displayed slightly earlier than the vehicle reaches the brake start point $P_s$. That is, the instruction display start position $P_a$ should be determined taking into account a reaction time $t_x$ (e.g., 1 second) that occurs before the driver actually starts the braking operation after the driver sees the braking instruction. In the calculation, the controller 11 may determine the reaction distance N that will be traveled before the driver responds to the displayed braking instruction, from the current actual vehicle speed $V_n$ and the reaction time $t_x$, in accordance with the following equation (3).

$$N=V_nt_x \quad (3)$$

The controller 11 determines the coordinates of the instruction display start position Pa from the determined reaction distance N and the braking start point $P_s$.

After the controller 11 determines the instruction display start position $P_a$, the controller 11 determines whether the current position reaches the instruction display start position $P_a$ (step S29). If the current position has not reached the instruction display start position $P_a$ (S29=NO), the operation of the method ends, thus maintaining the virtual escort vehicle IG in the form displayed (i.e., in step S23 or S25).

If the current position reaches the instruction display start position $P_a$ (S29=YES), the controller 11 may switches the form of the virtual escort vehicle IG with the brake lamp L in the off-state into a form in which the brake lamp L is in the on-state (step S30). For example, the virtual escort vehicle IG with the form in which the brake lamp L is in the off-state shown in FIG. 5 may be switched into the virtual escort vehicle IG with the form in which the brake lamp L is in the on-state shown in FIG. 9. Specifically, the controller 11 may read the form information 17 indicating the form in which the braking lamp L is in the on-state from the form information storage portion 14c of the information storage portion 14 and may display the virtual escort vehicle IG in the form indicated by the form information 17 on the combiner CB via the heads-up display 19. Thus, the driver will see the virtual escort vehicle IG in the form with the turned-on brake lamp L displayed on the combiner CB. In response to the turning-on of the brake lamp L, the driver can reduce the vehicle speed by operating the brake pedal. That is, the driver will be warned to decelerate the vehicle speed by operating the brake pedal at a location where a change in the road form occurs (when the vehicle approaches a curving road) in response to turning-on of the brake lamp of the virtual escort vehicle IG that behaves as if it were an actual vehicle running ahead to guide the vehicle of the user. When the driver drives the vehicle on an unfamiliar road, the displayed virtual escort vehicle IG behaving as if it were an actual escort vehicle running ahead of the vehicle presents, in advance, to the driver a proper driving instruction corresponding to an actual road form.

If the virtual escort vehicle IG is already displayed (step 20=YES), the controller 11 may determine whether the brake lamp L of the displayed virtual escort vehicle IG is in the on-state (step S31). If the brake lamp L of the virtual escort vehicle IG is in the off-state (step S31=NO), the controller 11 determining whether it is a time to switch the displayed information (step S22), as described above.

If the brake lamp L of the displayed virtual escort vehicle IG is in the on-state (step S31=YES), the controller 11 determines whether the reference point $P_1$ has been reached (step S32). If the reference point $P_1$ has not yet been reached (step S32 is NO), the operation of the method ends, while maintaining the displayed virtual escort vehicle IG in the form in which the brake lamp L is in the on-state.

On the other hand, if the reference point $P_1$ has been passed through (step S32 is YES), the controller 11 switches the form of the virtual escort vehicle IG with the brake lamp L in the on-state into a form in which the brake lamp L is in the off-state (step S33). Specifically, the controller 11 may read the form information 17 indicating the form in which the braking lamp L is in the off-state from the form information storage portion 14c of the information storage portion 14 and may display the virtual escort vehicle IG with the brake lamp L in the off-state on the combiner CB via the heads-up display 19. Thereafter, the operation of the method ends.

Thus, at this point in time, the brake lamp L of the virtual escort vehicle IG displayed on the combiner CB is turned off. In response to the turning-off of the brake lamp L, the driver may release the brake pedal from the pressed state. That is, the vehicle has reached the start point (the reference point $P_1$) of the curving road while smoothly reducing the vehicle speed to a proper speed, and the driver releases the brake pedal. Thus, when the driver drives the vehicle on an unfamiliar road, the virtual escort vehicle IG displayed as if it were actually running ahead of the vehicle presents, in advance, to the driver a proper driving instruction corresponding to an actual road form.

According to the above example, the virtual vehicle IG may be displayed on the windshield GL such that the displayed virtual vehicle IG behaves as if it were an actual escort vehicle running ahead to guide the vehicle of the user. When the vehicle reaches a display change point $P_c$ before a point at which the road form changes, the form of the displayed virtual escort vehicle IG may be switched into a form corresponding to the point at which the road form changes. Thus, the displayed virtual escort vehicle IG, behaving as if it were actually running on the road ahead of the vehicle, allows the driver to visually get information on the road form in advance and to properly drive the vehicle by operating the steering wheel depending on the predicted road form.

According to the above example, if the current position of the vehicle reaches an instruction display start position $P_a$ before a reference point $P_1$, the form of the displayed virtual escort vehicle IG with the brake lamp L in the off-state may be switched into a form in which the brake lamp L is in the on-state. That is, the brake lamp of the virtual escort vehicle IG may be turned on to indicate a braking operation that would be performed by an actual vehicle running ahead depending on the varying road form. This allows the driver to receive a proper driving instruction in terms of braking or the like based on a predicted road form.

According to the above example, a standard speed $V_s$, indicating an optimum speed may be preset for each reference point $P_1$. A braking start point $P_s$ corresponding to a particular reference point $P_1$ may be determined based on the standard speed $V_s$ at the reference point $P_1$ and an actual vehicle speed $V_n$. Thus, the braking start point $P_s$ may be properly determined depending on the actual vehicle speed $V_n$.

According to the above example, an instruction display start position $P_a$ may be determined based on the braking start point $P_s$ taking into account a reaction distance N determined based on the current vehicle speed $V_n$ and the reaction time $t_x$. Thus, the instruction display start position $P_a$ may properly determined depending on the actual vehicle speed $V_n$.

According to the above example, when there is another vehicle running within, for example, about 300 meters ahead of the vehicle of the user, the virtual escort vehicle IG may not be displayed so that the driver can drive the vehicle in accordance with the movement of the vehicle actually running ahead.

According to the above example, when there is a moving object, for example, within about 20 meters from the vehicle of the user, the virtual escort vehicle IG may not be displayed so that when the moving object is approaching the vehicle of the user, the driver can drive the vehicle while paying attention to the moving object.

According to the above example, it may be determined whether turning-on/off of the brake lamp of the virtual escort vehicle IG is allowed for a road on which the vehicle is currently running. For example, when the vehicle is running on a road section where a braking operation should be avoided because braking can cause the vehicle to slip, the virtual escort vehicle IG with the brake lamp L in the on-state is not displayed. Thus, the driver can receive a safe driving instruction.

According to the above example, in the calculation of the braking start distance according to equation (2), it is assumed that the calculated braking start distance D is positive. However, when the actual vehicle speed $V_n$ is lower than the standard speed $V_s$ and the braking start distance D becomes zero or negative, the exemplary method may end without performing the calculation of the instruction display start position $P_a$, to maintain the virtual escort vehicle IG in the form in which the brake lamp L is in the off-state.

When the braking start distance D is zero or negative, the instruction display start position $P_a$ may be calculated (e.g., in step S28). If the calculated instruction display start position $P_a$ is ahead of the reference point $P_1$ when seen from the vehicle of the user, the exemplary method may end to maintain the virtual escort vehicle IG in the form in which the brake lamp L is in the off-state.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, in the above examples, the controller 11 may determine the optimum vehicle speed $V_a$ to be recommended at the current position based on the standard speed $V_s$ and the standard deceleration rate $G_a$ read from the memory 14, and based on the distance $L_x$ from the current position to the reference point, in accordance with equation (1), in which the standard deceleration rate $G_a$ is set to a fixed value (e.g., −0.15 G) which will not be felt as unusually fast.

The controller 11 may determine whether the current actual vehicle speed $V_n$ is higher than the recommended vehicle speed $V_a$ at the current position. If the actual vehicle speed $V_n$ is lower than the recommended vehicle speed $V_a$, the exemplary method may end while maintaining the virtual escort vehicle IG in the form displayed (e.g., in step S23 or S25).

However, when the actual vehicle speed $V_n$ is equal to or higher than the recommended vehicle speed $V_a$, the controller 11 may switch the form of the virtual escort vehicle IG with the brake lamp L in the off-state into a form in which the brake lamp L is in the on-state according to the form information 17 (step S30).

Furthermore, in the above examples, when the current position varies, the actual vehicle speed $V_n$ may be compared with the recommended vehicle speed $V_a$ at the current position to determine the timing of turning on the brake lamp L. This allows the brake lamp L to be turned on at a best time determined in real time depending on the driving condition.

In the above examples, it is determined whether displaying of the braking instruction is allowed based on the display allowance/prohibition information included in the standard driving condition information 16 stored in the standard driving condition storage portion 14b. The braking instruction display allowance/prohibition information may be defined for all links or nodes on the map data. The controller 11 may always checks the display allowance/prohibition information defined for links or nodes to determine whether to display the braking instruction.

The braking instruction display allowance/prohibition information may be defined and added to the curving road information 15 stored in the road form storage portion 14a so that the determination may be made according to the curving road information 15.

Figure 14:
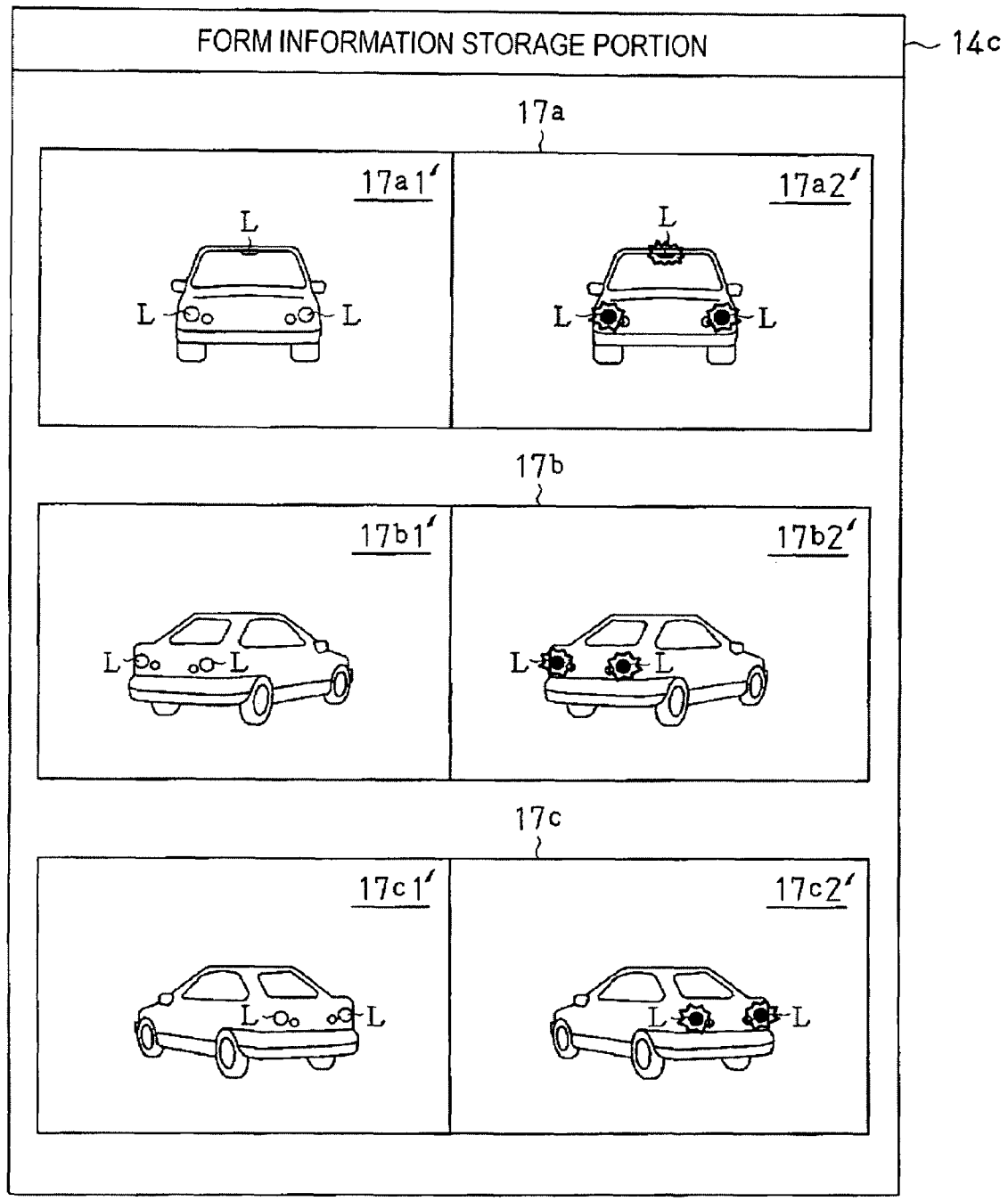
FIG. 14 is a schematic diagram showing forms indicated by form information according to an exemplary implementation of the principles described herein.

In the above examples, the driving direction of the virtual escort vehicle IG displayed on the windshield GL may be indicated by the driving direction mark S. Alternatively, as shown, for example, in FIG. 14, several pieces of form information 17 may be prepared to represent the virtual escort vehicle IG in various forms corresponding to respective driving directions, and the virtual escort vehicle IG may be displayed in a selected form, for example, without using the driving direction mark S.

Figure 15:
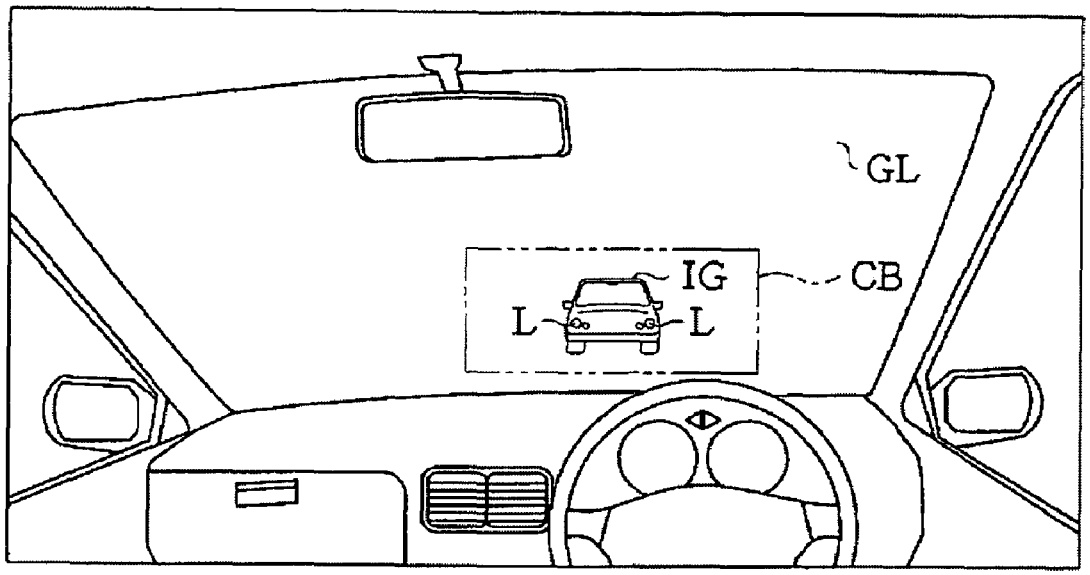
FIG. 15 is a schematic diagram illustrating a virtual escort vehicle running straight according to an exemplary implementation of the principles described herein.
Figure 16:
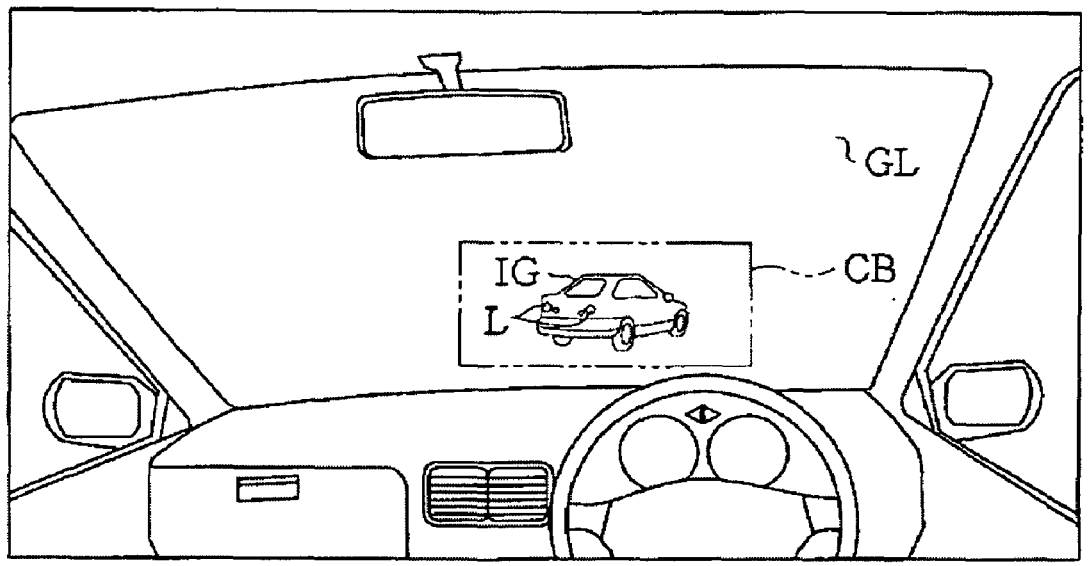
FIG. 16 is a schematic diagram illustrating a virtual escort vehicle turning to right according to an exemplary implementation of the principles described herein.
Figure 17:
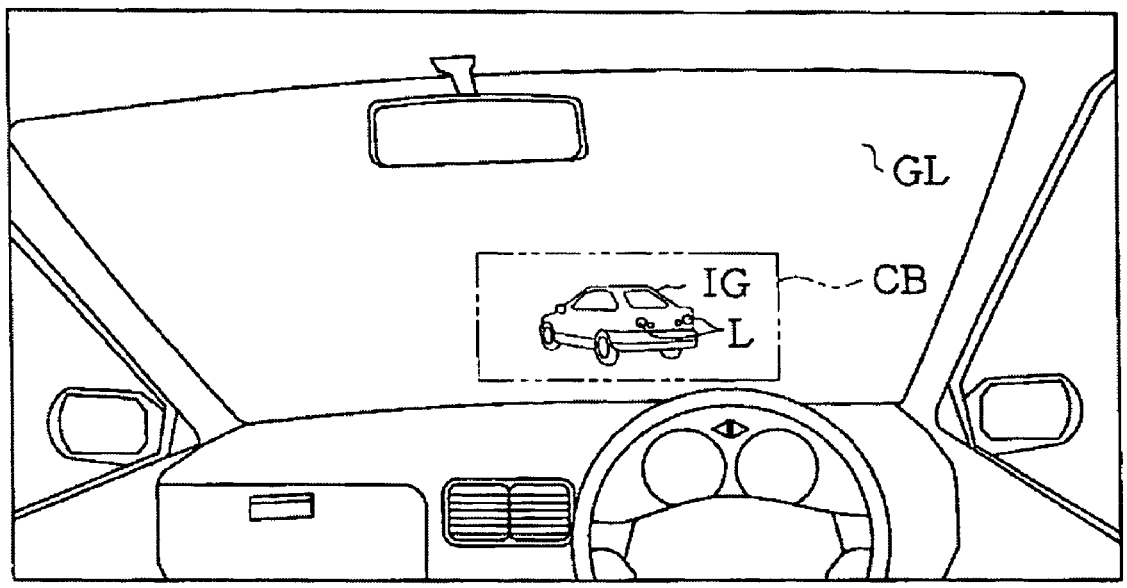
FIG. 17 is a schematic diagram illustrating a virtual escort vehicle turning to left.

Thus, in the example shown in FIG. 15, the virtual escort vehicle IG with the brake lamps L in the off-state running straight is displayed in accordance with the form 17a1', which is one of the sub-forms of the form information 17a included in the form information 17. In the example shown in FIG. 16, the virtual escort vehicle IG with the brake lamps L in the off-state turning to right is displayed in accordance with the form 17b1', which is one of the sub-forms of the form information 17b included in the form information 17. In the example shown in FIG. 17, the virtual escort vehicle IG with the brake lamps L in the off-state turning to left is displayed in accordance with the form 17c1', which is one of the sub-forms of the form information 17c included in the form information 17.

Note that a driving direction mark S used in the examples shown in FIGS. 4-7 and 9 may also be superimposed on the forms shown in FIGS. 14-17 according to the form information 17.

In the above examples, the virtual escort vehicle IG may be displayed on the windshield GL via the heads-up display 19. Alternatively, the virtual escort vehicle IG may be displayed on a display disposed at a location in front of the driver's seat. It is desirable that the display for displaying the virtual escort vehicle IG be disposed at a location that does not cause the driver to be distracted from driving.

In the above examples, the virtual vehicle IG may not be displayed when there is another vehicle running ahead within, for example, about 300 meters from the vehicle of the user. However, the range is not limited to 300 meters, and the range may be set to any other value.

In the above examples, the virtual vehicle IG may not displayed when there is a moving object in an area, for example, with a radius of 20 meters from the vehicle of the user. However, the radius is not limited to about 20 meters, and the radius may be set to any other value.

In the above examples, the curving road information 15 may be employed as the road form information to indicate a road where turning-on of the brake lamp L is performed. The road form information may indicate roads other than curving roads, such as uphill or downhill roads, roads abruptly changing in road width, and/or roads having no guard fences, where a braking operation is needed.

In the above examples, the driving support apparatus may be embodied in the form of the navigation apparatus 10. Alternatively, the driving support apparatus may be embodied in the form of, for example, a combination of the navigation apparatus 10 installed in the vehicle and an information control center with which the navigation apparatus 10 is capable of communicating, for example, via a portable telephone network. The navigation apparatus 10 may thus periodically transmits data indicating the current position and the actual vehicle speed $V_n$ to the information control center. Based on the received data indicating the current position and the actual vehicle speed $V_n$, the information control center may select a form of the virtual escort vehicle IG to be displayed on the windshield GL and transmit the form information 17 indicating the selected form to the navigation apparatus 10. According to the received form information 17, the navigation apparatus 10 may display the virtual escort vehicle IG in the form indicated by the form information 17 on the windshield GL via the heads-up display 19.

In this case, the navigation apparatus 10 does not need to include, for example, the road form storage unit 14a, the standard driving condition storage portion 14b, and the form information storage portion 14c, and thus it is possible to reduce the size and cost of the navigation apparatus 10. Furthermore, the removal of these components results in a reduction in a processing load imposed on the controller 11, thereby reducing the processing load requirements of the controller 11.

In the above examples, the data indicating the standard speed $V_s$ may be stored in advance in the information storage portion 14. Instead of storing the data indicating the standard speed $V_s$ in the information storage portion 14, the standard speed $V_s$ may be calculated from the curvature radius R stored, for example, in the road form storage portion 14a and a standard cornering gravity $G_b$ according to the following equation (4), in which the standard cornering gravity $G_b$ may be set to a fixed value (e.g., 0.20 G) that does not cause the driver to feel an unusually large gravity during the cornering.

$$G_b = \frac{V_s^2}{R} \qquad (4)$$

In a case in which the curvature radius R is not stored in the road form storage portion 14a, it is possible to calculate the curvature radius R, for example, from node data of the three adjacent nodes.

In the above examples, the actual driving condition information may indicate the actual vehicle speed $V_n$, and the standard driving condition information may indicate the standard speed $V_s$. Alternatively, for example, the actual driving condition information and the standard driving condition information may indicate the engine speed, the acceleration pedal pressing-down amount, and/or the transmission gear ratio so as to represent the actual vehicle speed $V_n$ and the standard speed $V_s$.

What is claimed is:

1. A driving support method, comprising:
    displaying a virtual escort vehicle that appears to be driving ahead of a user's vehicle on at least one of a windshield of the user's vehicle and a display disposed in front of a driving seat of user's vehicle;
    determining a braking start distance based on an actual vehicle speed, a predetermined standard deceleration rate, and a predetermined standard speed for a predetermined reference point located ahead of the current position of the user's vehicle;
    determining a reaction distance by multiplying the actual vehicle speed by a predetermined reaction time;
    determining as an instruction display start position, a point located before a distance calculated by addition of the braking start distance and the reaction distance based on the predetermined reference point; and
    turning on a brake lamp of the virtual escort vehicle as an instruction of braking for the user's vehicle when the current position of the user's vehicle reaches the instruction display start position.

2. A driving support apparatus, comprising:
a controller configured to:
    display a virtual escort vehicle that appears to be driving ahead of a user's vehicle on at least one of a windshield of the user's vehicle and a display disposed in front of a driving seat of user's vehicle;
    determine a braking start distance based on an actual vehicle speed, a predetermined standard deceleration rate, and a predetermined standard speed for a predetermined reference point located ahead of the current position of the user's vehicle;
    determine a reaction distance by multiplying the actual vehicle speed by a predetermined reaction time;
    determine as an instruction display start position, a point located before a distance calculated by addition of the braking start distance and the reaction distance based on the predetermined reference point; and
    turn on a brake lamp of the virtual escort vehicle as an instruction of braking for the user's vehicle when the current position of the user's vehicle reaches the instruction display start position.

* * * * *